United States Patent [19]

Jester et al.

[11] Patent Number: 4,631,994
[45] Date of Patent: Dec. 30, 1986

[54] ADJUSTABLE HOLDER FOR A CUTTING TOOL

[75] Inventors: Willi Jester, Herten; Norbert Reiter, Mettmann, both of Fed. Rep. of Germany

[73] Assignee: Fried. Krupp Gesellschaft mit beschränkter Haftung, Essen, Fed. Rep. of Germany

[21] Appl. No.: 623,433

[22] Filed: Jun. 22, 1984

[30] Foreign Application Priority Data

Jul. 13, 1983 [DE] Fed. Rep. of Germany ....... 3325286

[51] Int. Cl.⁴ .............................. B23B 29/10
[52] U.S. Cl. ...................... 82/36 R; 82/12; 407/75; 407/83; 407/89; 408/161; 408/179; 408/180; 408/187
[58] Field of Search ............ 407/73, 75, 77, 79, 407/81–84, 87, 89, 90, 92; 82/36 R, 12; 408/153, 161, 162, 165, 168, 179, 180, 159, 187

[56] References Cited

U.S. PATENT DOCUMENTS

| 2,368,736 | 2/1945 | Wyrick | 407/81 |
| 3,253,322 | 5/1966 | Christian | 407/89 |
| 3,498,164 | 3/1970 | Miko et al. | 407/75 |
| 3,683,473 | 8/1972 | Joynson . | |
| 3,755,868 | 9/1973 | LaForge et al. | 407/75 |
| 3,842,470 | 10/1974 | Hertel . | |

FOREIGN PATENT DOCUMENTS

| 657995 | 3/1938 | Fed. Rep. of Germany | 407/84 |
| 709871 | 8/1941 | Fed. Rep. of Germany | 407/75 |
| 1941982 | 2/1970 | Fed. Rep. of Germany . | |
| 2424790 | 12/1975 | Fed. Rep. of Germany . | |
| 2506902 | 5/1977 | Fed. Rep. of Germany . | |
| 3001330 | 7/1981 | Fed. Rep. of Germany . | |
| 3008547 | 9/1981 | Fed. Rep. of Germany . | |
| 600977 | 6/1978 | Switzerland . | |
| 1210735 | 10/1970 | United Kingdom . | |

Primary Examiner—Francis S. Husar
Assistant Examiner—Jerry Kearns
Attorney, Agent, or Firm—Spencer & Frank

[57] ABSTRACT

A linearly and angularly adjustable holder for a cutting tool having primary and secondary cutting edges includes a basic element, a receptacle element for the cutting tool rotatably mounted on the basic element, and a setting element slidably mounted on the basic element.

The receptacle element is mounted on the basic element so as to be pivotal about the point of intersection of the primary and secondary cutting edges of the cutting bit. An adjustment screw 50 whose threaded portion is seated in the basic element and whose head engages a recess in the receptacle element serves to perform the angular adjustment. The linear adjustment is accomplished with the aid of a double threaded adjustment screw which connects a wedge and the basic element and which slidably engages the setting member to control the length of the holder.

6 Claims, 7 Drawing Figures

ADJUSTABLE HOLDER FOR A CUTTING TOOL

BACKGROUND OF THE INVENTION

The present invention relates to a cutting tool holder for a rotating cutting head in a turning machine for machining cylindrical workpieces, such as pipes, cylindrical steel or the like, the holder being provided to secure a cutting tool having at least one primary and one secondary cutting edge.

Generally, four such holders for cutting tools are mounted on a rotating head of a turning machine. A respective cutting tool is clamped in each of the four holders, which in turn are mounted on the rotating head so that the four cutting tools are symmetrically disposed around the workpiece. Each of the cutting tools has a straight primary cutting edge for rough cutting and a straight secondary cutting edge for finish cutting, the primary cutting edge intersecting the secondary cutting edge at an angle. A cutting tool may have more than one pair of primary and secondary cutting edges so that the tool need not be discarded after the first pair becomes worn. During use a primary and secondary cutting edge pair of each of the four cutting tools disposed around the workpiece simultaneously participate in the cutting, so that a finished shaft is machined in a single process step. The cutting forces should be as symmetrical as possible between the individual cutting tools and the workpiece so that no bending forces are exerted on the head or the workpiece which would interfere with the desired manufacturing precision of the workpiece. For this purpose, the secondary cutting edges, in particular, must be aligned precisely parallel to the center axis of the workpiece.

In a known device, a reversible cutting tool provided with two pairs of primary and secondary cutting edges is inserted in a corresponding recess in a holder and is fastened to the holder by means of a locking or clamping jaw. The holder itself is essentially made of two parts and comprises a basic element provided with a longitudinal groove and an adjustable member which is displaceable therein and whose position can be set relative to the basic element by means of a screw and can be fixed with the aid of a clamping screw that passes through an opening in the basic element.

For economic reasons, the holder and the reversible cutting tool cannot be produced with any desired precision. Since dimensional deviations may add up, it is possible in the known device that an unfavorable angular position results for the secondary cutting edge. Such an unfavorable angular position can be corrected by regrinding the reversible cutting tool, but this leads to undesirable losses in service life.

In a device having a convexly designed cutting edge it is known to adjust the angle of the holder about the center point of a cutting edge which has the shape of a circular arc (see, e.g., German Offenlegungsschrift No. 3,008,547). Such an adjustment, however, cannot be used with cutting tools having linear primary and secondary cutting edges since this would cause the primary cutting edge to be also displaced axially with respect to the cylindrical workpiece, thus producing a thicker—or thinner—chip at this point compared to cutting tools disposed in other holders in the same cutting head, which would interfere with the desired symmetrical distribution of forces.

Furthermore, U.S. Pat. No. 3,842,470 to Karl Hertel discloses a device wherein a reversible cutting tool equipped with two pairs of primary and secondary cutting edges is disposed in a corresponding recess of a holder and can be angularly adjusted by means of a setting wedge. When readjusting the angular position of the secondary cutting edge, the reversible cutting tool is pivoted essentially about its frontal face oriented away from the primary cutting edge when in use, thus causing the point of intersection formed by the primary and secondary cutting edges engaging the workpiece to perform a movement radial to the workpiece. With this known device, it may therefore be necessary, after setting the angle of the secondary cutting edge, to readjust the radial setting. Moreover, this known device has the drawback that, depending on the angular position of the reversible cutting tool, there may occur linear stresses at least at one point between the above-mentioned frontal face of the reversible cutting tool and the corresponding receptacle in the holder.

SUMMARY OF THE INVENTION

It is the object of the present invention to provide an adjustable holder for a cutting tool having at least one primary and one secondary cutting edge wherein—with the same chip thickness produced by the primary cutting edge of each cutting tool disposed in the cutting head—it is possible to attain an exactly parallel position of the secondary cutting edge with respect to the center axis of the workpiece and a precisely rectangular position with respect to the rear of the holder, without it being necessary to regrind the secondary cutting edge or radially readjust the entire device. Another object is to permit sensitive adjustment of the cutting tool in the radial direction.

These objects are attained by providing a holder having a receptacle element conforming in shape to part of the periphery of a cutting tool having primary and secondary cutting edges that intersect, the receptacle element and holder forming a pivot bearing for rotating the receptacle element about the point formed by the intersection of the cutting edges of the cutting tool when it is held in the receptacle element. The rotatability of the receptacle element permits adjustment of the angle of the secondary cutting edge as desired without grinding. Due to the fact that the pivot point coincides with the point of intersection of the primary and secondary cutting edges, the position of the primary cutting edge is not changed, particularly when seen in the axial direction of the workpiece.

A particularly simple embodiment of the pivot bearing can be achieved by providing an annular groove in the receptacle element and a corresponding annular projection in the holder, or vice versa.

Although a setting of the angular position of the secondary cutting edge can be done at will, it is also advantageous to provide an adjustment screw in the holder, the head of the screw engaging a corresponding recess in the periphery of the receptacle element.

The secondary cutting edge can be set with particular sensitivity in the radial direction by providing a longitudinal groove in the basic element of the holder for slidably accommodating an elongated setting member having an axis lying in a plane passing through the secondary cutting edge, the setting member having an abutment face for engagement by a wedge whose position is adjustable by means of a double threaded adjustment screw connecting the wedge to the basic element.

Figure 2:
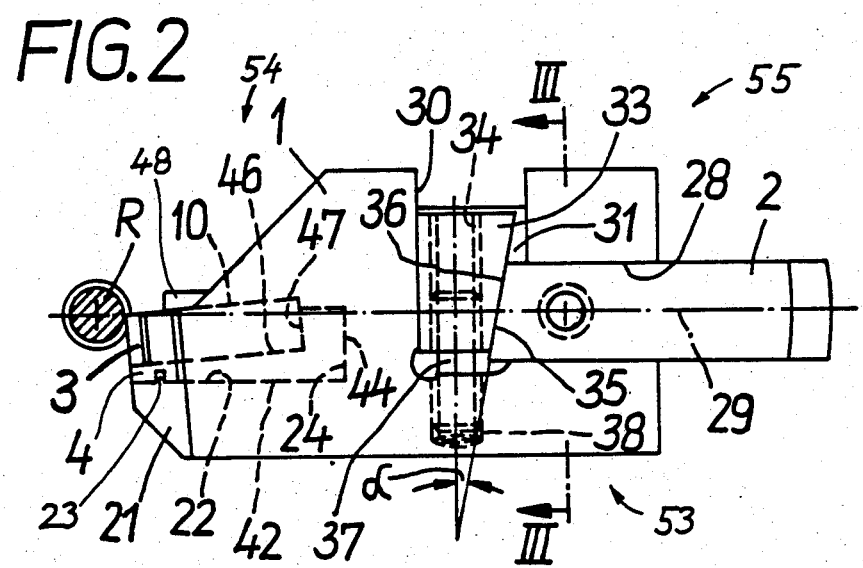
FIG. 2 is a side view of the holder as viewed in the direction II in FIG. 1.
Figure 3:
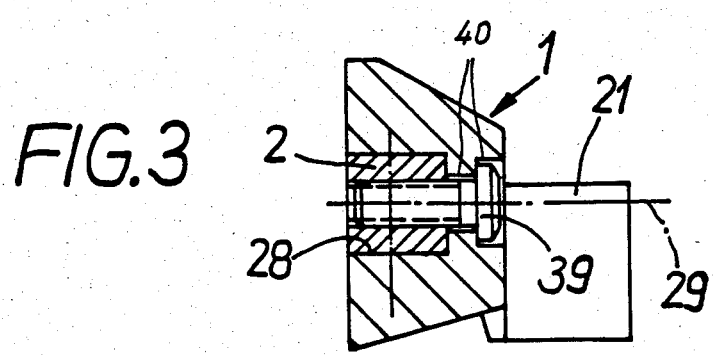
FIG. 3 is a cross-sectional view along line III—III of FIG. 2.
Figure 4:
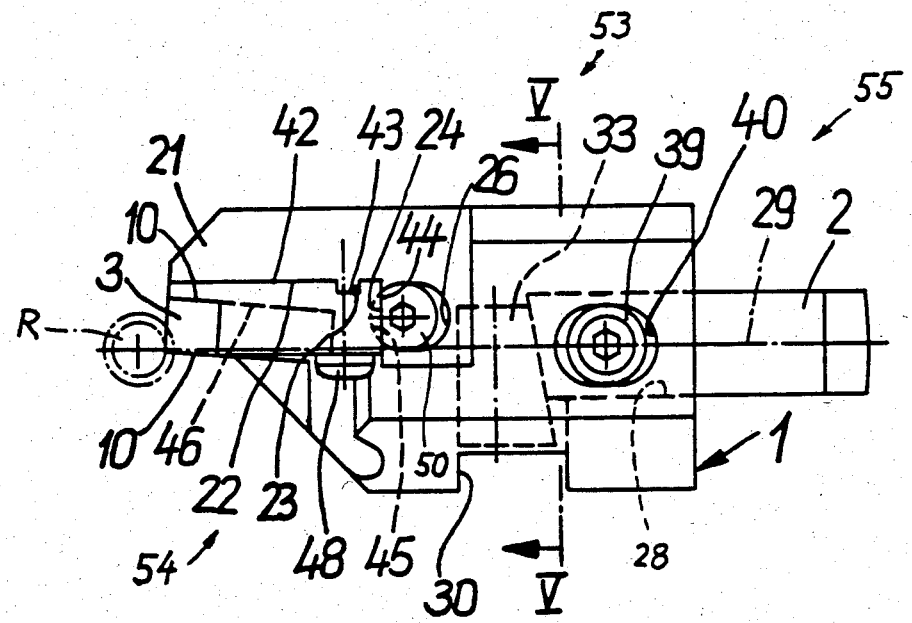
FIG. 4 is a side view of the holder as viewed in the direction IV in FIG. 1.
Figure 5:
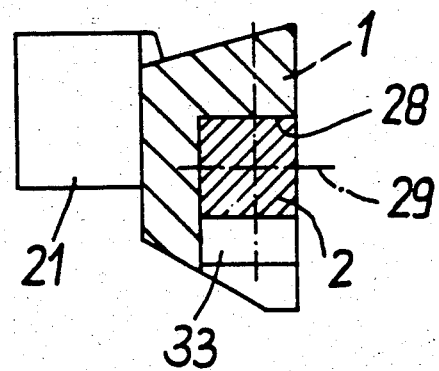
FIG. 5 is a cross-sectional view along line V—V of FIG. 4.

For the sake of simplicity, in FIGS. 2 and 4, the locking jaw has been omitted.

DESCRIPTION OF A PREFERRED EMBODIMENT

Figure 1:
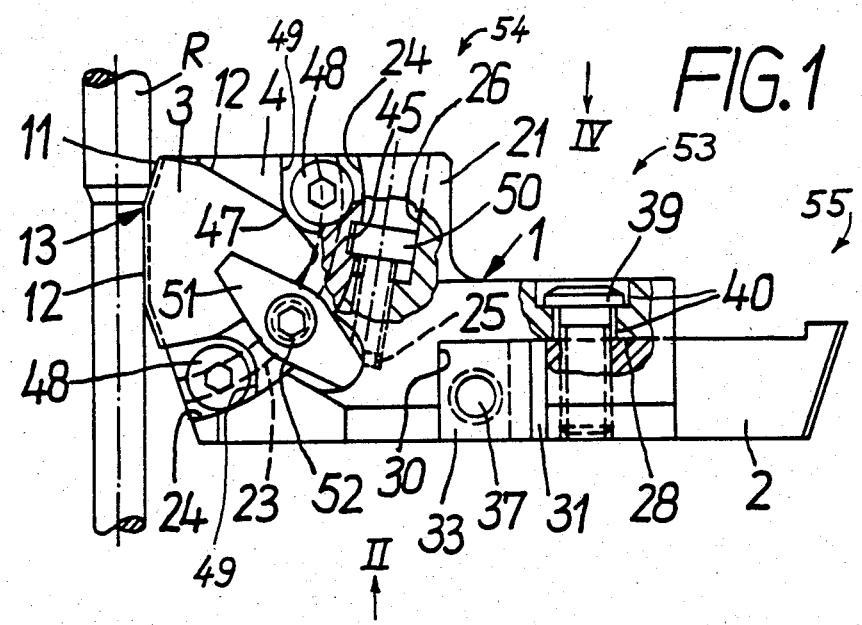
FIG. 1 is a top plan view of the holder of the present invention, partially cut away, with a cutting tool mounted therein for machining a workpiece.

In FIG. 1, cutting tool holder 53 has an angular adjustment portion 54 and a linear adjustment portion 55. Angular adjustment portion 54 includes a receptacle element 4 which is rotatably mounted on basic element 1 and which holds a reversible and exchangeable cutting tool bit or insert 3. The angular position of element 4 and consequently of tool bit or tool 3 can be adjusted via a head type adjustment screw 50, which is mounted in basic element 1 and the head of which engages receptacle element 4, as will be subsequently described.

Linear adjustment portion 55 includes a setting member 2 which is slidably mounted on basic element 1 and which cooperates with a wedge 33 that is movably connected to basic element 1 by a double threaded adjustment screw 37. Before proceeding further with the detailed description of holder 53 it would be useful to refer to FIGS. 6 and 7 for a summary of the major operational principles of angular adjustment portion 54 and linear adjustment portion 55.

Figure 6:
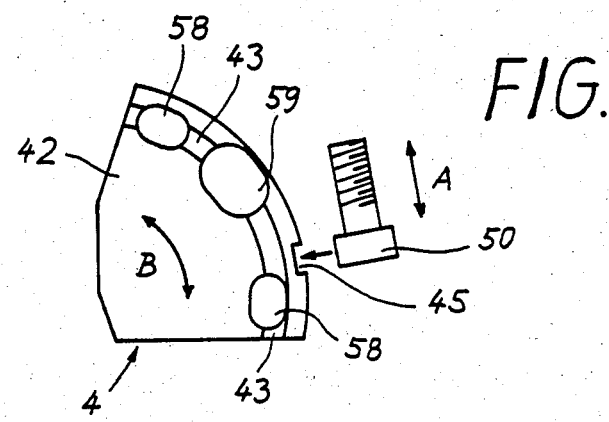
FIGS. 6 and 7 schematically illustrate the angular and linear adjustment features, respectively, with FIG. 6 illustrating a bottom plan view of a rotatably mounted receptacle element and with FIG. 7 illustrating an exploded side view showing the engagement of a linearly movable setting member with a wedge that is connected to the basic element of the holder by a double threaded adjustment screw.

In FIG. 6, which illustrates the underside of rotatably mounted receptacle element 4, it will be apparent that manual rotation of adjustment screw 50, whose head engages in a notch 45 in element 4, displaces screw 50 as illustrated by arrow A and thereby produces rotation or swivel movement of receptacle element 4 as indicates by arrow B.

Figure 7:
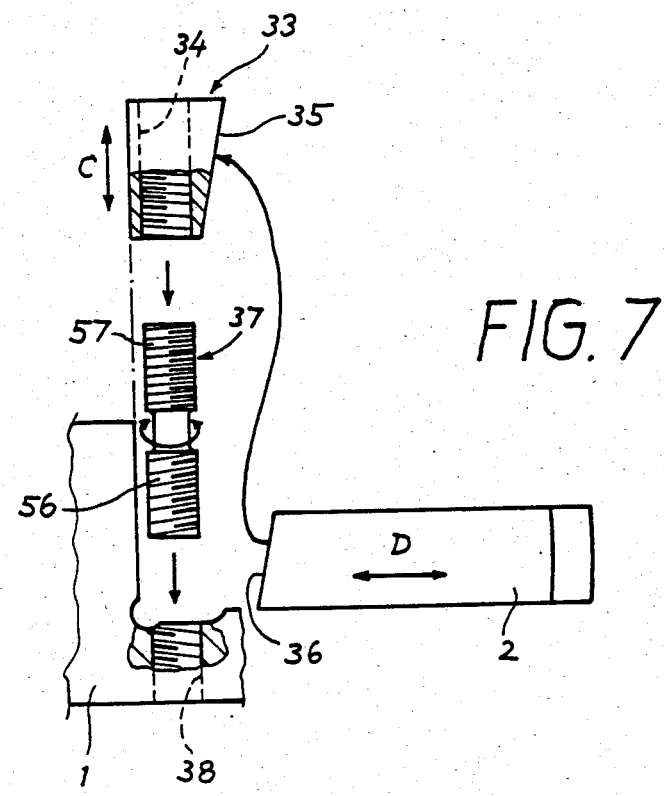

In FIG. 7 double threaded adjustment or set screw 37 is threaded at one end 56 with a normal lead or pitch s, the end 56 being engaged with a correspondingly threaded hole or female thread 38 in basic element 1. At the other end 57 set screw 37 is threaded with a finer lead or pitch s', the end 57 being engaged with a correspondingly threaded hole or female thread 34 in wedge 33. It will be apparent that one rotation of screw 37, for example, will move screw 37 with respect to basic element 1 by a first amount corresponding to lead s and will simultaneously move it with respect to wedge 33 by a smaller second amount corresponding to lead s'. Accordingly wedge 33 will be moved with respect to basic element 1 only by the small amount (s−s'), i.e. by an amount corresponding to the difference between the two leads s and s'. This small amount of movement permits precise adjustment of the vertical position of wedge 33 as indicated by arrow C with respect to basic element 1.

Setting member 2, which is clamped into the rotating head (not shown), has a face 36 which slidably engages a corresponding face 35 of wedge 33 to produce the movement indicated by arrow D when cutting tool holder 53 is linearly adjusted.

Referring next to FIGS. 1 and 2, reversible cutting tool 3 has two parallel-arranged cover and contact faces 10, respectively, and its periphery is shaped as a nine-sided polygon with three primary corners. Tool 3 is equipped with primary cutting edges 11 and secondary cutting edges 12. The point of intersection formed by the respective primary cutting edge 11 engaged with the cylindrical workpiece R being cut and the associated secondary cutting edge 12 is marked with the numeral 13.

The basic element 1 has a broad front portion 21 including a contact face 22 for receptacle 4. Contact face 22 is provided with an annular raised guide portion 23 and is terminated by a concentrically arranged hollow cylindrical wall 24. The center point of the annular raised portion or projection 23 as well as the center point or axis of the hollow cylindrical wall 24 are coincident with the point of intersection 13 of the primary and secondary cutting edges 11 and 12.

With reference next to FIGS. 1 and 4, at a slight distance from the hollow cylindrical wall 24, the front portion 21 of basic element 1 is provided with a recess which includes a threaded bore 25 and a hollow cylindrical widened portion 26 for receiving screw 50. It should be noted that FIG. 4 illustrates holder 53 as viewed in the direction IV in FIG. 1, but in inverted form so that the workpiece R retains its position to the left just as in FIGS. 1 and 2. That is, FIG. 4 illustrates holder 53 as it would appear to a person who is standing on the lower side of FIG. 1 and bending over holder 53 in order to view the upper side of FIG. 1.

Referring hereafter to the Figures in general, element 1 is provided with a groove 28 for guiding setting member 2, which groove—aside from a slight amount of play or display—corresponds to the dimensions of the setting member. The secondary cutting edge 12 currently in use lies in the (imaginary) center plane 29 of groove 28. Perpendicular to groove 28, basic element 1 has supporting face 30. Between this supporting face 30 and groove 28, basic element 1 has opening 31 in which there is disposed wedge 33 equipped with threaded bore 34. The inclined face 35 of wedge 33 facing away from supporting face 30 presses against the frontal face 36 of setting member 2 facing reversible cutting tool 3. Face 36 of setting member 2 and face 35 of wedge 33 are set at the same angle $\alpha$ with respect to the vertical in FIG. 2, e.g., at $\alpha = 10°$.

Wedge 33 and screw 37 are constructed, as described above, so that a turn to the right of double threaded screw 37 through 360° causes wedge 33 to be moved downwardly only by the slide path (s−s'). Due to the sliding movement of face 35 with respect to face 36 as wedge 33 is displaced, setting member 2 is thus moved only along a path (s−s')×tan $\alpha$. If, for example, the pitch s = 1.25 mm, pitch s'=0.75 mm, and angle $\alpha = 10°$, one revolution of double threaded screw 37 corresponds to a slide path for the setting member 2 of barely 9/100 mm. Wedge 33 thus permits a very fine linear setting of the holder and thus of the secondary cutting edge 12 in the radial direction with respect to the axis of workpiece R.

Setting member 2 is held in basic element 1 with the aid of a clamping screw 39. In order to permit displacement of element 1 relative to setting member 2 during linear adjustment, an elongated opening 40 is provided for loosening of screw 39 in basic element 1.

Receptacle element 4 is provided with a contact or support face 42 which corresponds to contact face 22 in basic element 1 and with a cylindrical wall 44 which corresponds to hollow cylindrical wall 24 in basic element 1. Similarly, annular groove 43 in receptacle element 4 corresponds to annular portion 23 of basic element 1. As in basic element 1, the center point or the axis, respectively, of groove 43 and of wall 44, wherein notch 45 is provided, passes through the point of intersection 13 (see FIG. 1) of primary cutting edge 11 and of secondary cutting edge 12. It will be apparent that the sliding engagement of annular portion 23 in annular groove 43 and the sliding engagement of cylindrical wall 44 with respect to hollow cylindrical wall 24 provide a pivot bearing for rotating receptacle element 4 about intersection point 13.

At its upper face, receptacle element 4 is provided with a recess 46 whose outline 47 corresponds to part of the outer contour of reversible cutting tool 3. Receptacle element 4 is held to basic element 1 by means of two head type clamping screws 48. For supporting the heads of the screws 48 the upper face of receptable element 4 is further provided with recesses 49. The passage holes of element 4 for the threaded part of the screws 48 are performed as elongated holes or slots 58 (FIG. 6) so as to permit the pivoting of element 4 with respect to basic element 1. The ends of the threaded part of the screws 48 are engaged in respective female threads (not shown) located in the basic element 1. Adjustment screw 50, whose threaded portion is seated in threaded bore 25 and whose head engages in recess 45 of receptacle 4, serves to pivot receptacle element 4 and reversible cutting tool 3. With a lead or pitch in the threaded portion of adjustment screw 50 of, for example, s =1 mm, and a radius of the outer wall 44 of 36 mm, a 10° turn of screw 50 corresponds to a change in the angular position of secondary cutting edge 12 by merely 2.7 angular minutes. Before and after adjusting the angular position of the receptacle element 4 the clamping screws 48 must be, of course, loosened and tightened, respectively.

A locking jaw 51 (FIG. 1) is provided for fastening the reversible cutting tool 3 on holder 53 and is clamped to receptacle element 4 with the aid of a double threaded set screw 52, having a right-hand threaded end which extends through a slot 59 (FIG. 6) in receptacle element 4 into basic element 1 being engaged in a respective female threaded hole. The other end of the set screw 52 is provided with a left-hand threaded end being engaged in a respective female thread of the jaw 51. When rotating the double threaded set screw 52 an effective linear movement of the jaw 51 is achieved. Thread engagement of set screw 52 and jaw 51 forces jaw 51 to lift from tool 3 when being loosened.

It should be noted that locking jaw 51 has been omitted from FIGS. 2 and 4 for the sake of simplicity. The end of jaw 51 directed away from tool 3 is supported at element 1.

It will be understood that the above description of the present invention is susceptible to various modifications, changes and adaptations, and the same are intended to be comprehended within the meaning and range of equivalents of the appended claims.

What is claimed is:
1. A tool assembly, comprising:
a cutting tool having a periphery which includes at least one pair of primary and secondary cutting edges that intersect at a point; and
an adjustable holder which includes
a basic element having a planar supporting face,
a receptacle element pivotably mounted on said basic element and having a planar supporting face which rests the supporting face of said basic element, said receptacle element having a recess with a contour corresponding to part of the periphery of said cutting tool,
screw means releasably connecting said receptacle element to said basic element, and
clamping means releasably mounting said cutting tool within the recess of said receptacle element,
wherein the supporting face of one of said basic and receptacle elements has an annular groove therein, and
wherein one of said basic and receptacle elements includes bearing means cooperating with the other of said basic and receptacle elements for forming a pivot bearing to rotate said receptacle element about an axis passing through the intersection of the primary and secondary cutting edges, said bearing means including an annular projection which is provided on the supporting face without said annular groove and which is positioned to slidably mate with said annular groove.

2. The tool assembly of claim 1, wherein the surface of said receptacle element includes a portion configured as a portion of a cylinder having an axis running through the point of intersection of the primary and secondary cutting edges, and wherein said bearing means further includes a wall provided by said basic element and conforming to said portion configured as a portion of a cylinder, said portion configured as a portion of a cylinder slidably engaging said wall.

3. The tool assembly of claim 1, further comprising angular adjustment means mounted on said basic element and operatively connected to said receptacle element for manually adjusting the angular position of said receptacle element.

4. The tool assembly of claim 3, wherein the surface of said receptacle element has a notch therein and wherein said basic element has a bore therein, and wherein said angular adjustment means comprises a screw having a head and a threaded portion, the threaded portion being disposed in the bore and the head engaging the notch.

5. The tool assembly of claim 3, wherein said basic element has a first end and a second end, said bearing means being disposed at said first end, and wherein said second end of said basic element has an elongated groove therein having a center plane in which the secondary cutting edge lies, and further comprising linear adjustment means operatively connected to said basic element for manually adjusting the length of the holder, said linear adjustment means comprising an elongated setting member slidably accommodated in said groove.

6. The tool assembly of claim 5, wherein said elongated setting member has an end face through which said axis runs, and wherein said linear adjustment means further comprises a wedge disposed adjacent the end face of the elongated setting member and a double threaded adjustment screw connecting said wedge and said basic element.

* * * * *